US012750791B2

(12) United States Patent
Li et al.

(10) Patent No.: US 12,750,791 B2
(45) Date of Patent: Sep. 29, 2026

(54) METHOD AND DEVICE FOR POWER INDICATION INFORMATION TRANSMISSION

(71) Applicant: Telefonaktiebolaget LM Ericsson (publ), Stockholm (SE)

(72) Inventors: Haoyu Li, Beijing (CN); Fan Zhang, Beijing (CN); Changqing Yuan, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 500 days.

(21) Appl. No.: 18/269,977

(22) PCT Filed: Dec. 31, 2020

(86) PCT No.: PCT/CN2020/142182
§ 371 (c)(1),
(2) Date: Jun. 28, 2023

(87) PCT Pub. No.: WO2022/141410
PCT Pub. Date: Jul. 7, 2022

(65) Prior Publication Data
US 2024/0064660 A1 Feb. 22, 2024

(51) Int. Cl.
*H04W 52/42* (2009.01)
*H04L 27/26* (2006.01)
*H04W 52/34* (2009.01)

(52) U.S. Cl.
CPC ......... *H04W 52/42* (2013.01); *H04L 27/2602* (2013.01); *H04W 52/346* (2013.01)

(58) Field of Classification Search
CPC ............... H04W 52/42; H04W 52/346; H04W 52/0245; H04W 52/04; H04W 88/085;
(Continued)

(56) References Cited

U.S. PATENT DOCUMENTS 10,980,012 B2 * 4/2021 Choi .................... H04W 88/08
2004/0004933 A1 * 1/2004 Zhu .......................... H04J 11/00
370/203
(Continued)

FOREIGN PATENT DOCUMENTS

CN 102131211 A 7/2011
CN 102158894 A 8/2011
(Continued)

OTHER PUBLICATIONS

European Search Report and Opinion for European Patent Application No. 20967749.1 dated Sep. 6, 2024, 9 pages.
(Continued)

*Primary Examiner* — Fayyaz Alam
(74) *Attorney, Agent, or Firm* — Sage Patent Group

(57) ABSTRACT

A method and device for power indication information transmission are provided. The method includes receiving data subjected to inverse fast fourier transform (IFFT); buffering the received data within the time slot; determining power of the received data within the time slot; sending power indication information and the received data respectively, wherein the power indication information includes information of the power of the received data within the time slot. Therefore, power saving is improved significantly, and DPD also can get benefit from power indication information for pre-distortion processing.

8 Claims, 7 Drawing Sheets

(58) Field of Classification Search
CPC ........... H04W 52/0216; H04L 27/2602; H04L 5/0007; H04L 5/0091; Y02D 30/70
See application file for complete search history.

(56) References Cited

U.S. PATENT DOCUMENTS

| | | | | |
|---|---|---|---|---|
| 2013/0094433 A1* | 4/2013 | Nagata | H04W 52/346 | 370/315 |
| 2016/0198405 A1* | 7/2016 | Choi | H04W 52/028 | 370/311 |
| 2020/0045629 A1* | 2/2020 | Choi | H04W 52/028 | |
| 2023/0016744 A1* | 1/2023 | Low | H04W 36/023 | |

FOREIGN PATENT DOCUMENTS

| | | | |
|---|---|---|---|
| CN | 102340853 | A | 2/2012 |
| CN | 104868982 | A | 8/2015 |
| CN | 106470470 | A | 3/2017 |
| CN | 110831135 | A | 2/2020 |
| EP | 3225075 | B2 | 7/2019 |
| WO | 2017075789 | A1 | 5/2017 |
| WO | 2018127181 | A1 | 7/2018 |
| WO | 2020031602 | A1 | 2/2020 |
| WO | 2020156485 | A1 | 8/2020 |

OTHER PUBLICATIONS

International Search Report and Written Opinion of the International Searching Authority, PCT/CN2020/142182, mailed Sep. 28, 2021, 10 pages.

O-RAN Alliance, Technical Specification, O-RAN Fronthaul Working Group; Control, User and Synchronization Plane Specification, ORAN-WG4.CUS.0-v02.00, 2019, 218 pages.

* cited by examiner

METHOD AND DEVICE FOR POWER INDICATION INFORMATION TRANSMISSION

CROSS REFERENCE TO RELATED APPLICATIONS

This application is a 35 U.S.C. § 371 national stage application of PCT International Application No. PCT/CN2020/142182 filed on Dec. 31, 2020, the disclosure and content of which is incorporated by reference herein in its entirety.

TECHNICAL FIELD

Embodiments of the present disclosure generally relate to the field of wireless communications, and more particularly, to a method and device for power indication information transmission.

BACKGROUND

This section introduces aspects that may facilitate better understanding of the present disclosure. Accordingly, the statements of this section are to be read in this light and are not to be understood as admissions about what is in the prior art or what is not in the prior art.

The mobile communication network is growing year after year and it will soon move into the new mobile technologies. The new technologies will improve the throughout and data connectivity and due to that the energy consumption in Radio Units (RU) and Digital Unit (DU) may increase in a Radio Base Station (RBS). With the emergence of the new mobile technologies and growing network, the necessity for energy efficient mobile networks become more and more significant. Currently, many network operators focus on symbol-based power control in radio access networks (RAN).

The introduction of Open RAN (ORAN), is the final piece of the unbundling puzzle that enables mobile network operators to use equipment from multiple vendors and still ensure interoperability. The energy efficient remains a major concern for the network operators.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In current design, IQ data and IQ control information are generated and encapsulated in Baseband of DU. In addition, symbol power indication fields for all OFDM symbols carrying the IQ data, which included in slot or subframe information are also calculated and filled by Baseband Layer1 (BBL1) as part of slot information in a New Radio (NR) system or subframe information in a Long Term Evaluation (LTE). To realize energy saving, back stage, like Digital Frond End (DFE) may control power saving features, such as switch OFF/switch ON tx chain components at different levels in time domain (like symbol based and time slot based) or disable/enable carrier even radio unit with this information then. Beyond that, Digital Pre-Distortion (DPD) also can get benefit from symbol power indication information for pre-distortion processing.

Though there are many positive effects can benefit from the symbol-based power indication of slot information or subframe information, it is not a message defined in 3rd Generation Partnership Project (3GPP) specification or ORAN, and high specialized for some vendors in implementation. In ORAN Low Layer Split (LLS) structure, different vendors may use different symbol-based power control, for example, baseband of DU provided by different vendors will not sent power information related to each symbol to serving RU. Thus, there is no effective solution to solve the problem of energy saving in the ORAN system.

In order to solve at least part of the above problems, methods, apparatus, devices and computer programs are provided in the present disclosure. It can be appreciated that embodiments of the present disclosure are not limited to a wireless system operating in ORAN network, but could be more widely applied to any application scenario where similar problems exist.

To overcome or mitigate at least one of the above mentioned problems or other problem(s), various embodiments of the present disclosure mainly aim at providing methods, devices for power indication information transmission. Other features and advantages of embodiments of the present disclosure will also be understood from the following description of specific embodiments when reading in conjunction with the accompanying drawings, which illustrate, by way of example, the principles of embodiments of the present disclosure.

In a first aspect, there is provided a method for power indication information transmission. The method includes receiving data subjected to inverse fast fourier transform (IFFT). The method further includes buffering the received data within a time slot. The method further includes determining power of the received data within the time slot. The method further includes sending power indication information and the received data respectively, wherein the power indication information comprises information of the power of the received data within the time slot.

In an exemplary embodiment, sending the power indication information and the received data respectively includes: sending the received data after a time interval from the transmission of the power indication information.

In an exemplary embodiment, determining the power of the received data within the time slot includes: determining power of the received data on each OFDM symbol within the time slot.

In an exemplary embodiment, the power indication information includes the power of the received data on each symbol within the time slot.

In an exemplary embodiment, the received data is inphase and quadrature (IQ) data, power of the received data on each OFDM symbol within the time slot is determined according to following formula: $10\cdot\log 10(I[n]^2+Q[n]^2)-10\cdot\log 10(FS)$, wherein I is I component of the IQ data, Q is Q component of the IQ data, FS is full-scale power level of the IQ data, n is an index of the OFDM symbol.

In an exemplary embodiment, a length of the time interval is greater than a first threshold and smaller than a second threshold.

In a second aspect, there is provided a method for power indication information transmission. The method includes receiving power indication information to obtain information of power of data to be received within a time slot. The method further includes generating a power control information according to the received power indication information within a time interval. The method further includes receiving the data and performing power control according to the power control information on the data. There is a time difference between receiving the power indication information and receiving the data.

In an exemplary embodiment, the time difference between receiving the power indication information and receiving the data is the time interval, receiving the data after the time interval from receiving the power indication information.

In an exemplary embodiment, the information of power of the data within a time slot comprise power of the data on each OFDM symbol within the time slot.

In an exemplary embodiment, generating the power control information according to the received power indication information within the time interval includes generating a power control sequence corresponding to the power of the data on each OFDM symbol within the time slot.

In an exemplary embodiment, the power control sequence comprises indication whether to allocate power to a corresponding OFDM symbol.

In an exemplary embodiment, the power control sequence further comprises power of the corresponding OFDM symbol.

In an exemplary embodiment, performing power control according to the power control information on the data includes allocating power to each OFDM symbol according to the power control sequence.

In an exemplary embodiment, the received data is inphase and quadrature (IQ) data, power of the received data on each OFDM symbol within the time slot is determined according to following formula: $10\cdot\log 10(I[n]^2+Q[n]^2)-10\cdot\log 10(FS)$, where I is I component of the IQ data, Q is Q component of the IQ data, FS is full-scale power level of the IQ data, n is an index of the OFDM symbol.

In an exemplary embodiment, a length of the time interval is greater than a first threshold and smaller than a second threshold.

In a third aspect, there is provide a device for power indication information sending. The device for power indication information sending includes a processor and a memory. The memory contains instructions executable by the processor whereby the power indication information sending device is operative to receive data subjected inverse fast fourier transform (IFFT). The power indication information sending device is further operative to buffer the received data within a time slot. The power indication information sending device is further operative to buffer the received data within a time slot. The power indication information sending device is further operative to send power indication information and the received data respectively. The power indication information comprises information of the power of the received data within the time slot.

In a fourth aspect, there is provided a device for power indication information receiving. The device for power indication information receiving includes a processor and a memory. The memory contains instructions executable by the processor whereby the power indication information receiving device is operative to receive power indication information to obtain information of power of data to be received within a time slot. The power indication information receiving device is further operative to generate a power control information according to the received power indication information within a time interval. The power indication information receiving device is further operative to receive the data and performing power control according to the power control information on the data. There is a time difference between receiving the power indication information and receiving the data In a fifth aspect, there is provided a communications system. The communication system includes a device for power indication information sending and a device for power indication information device. The device for power indication information sending is configured to receive data subjected inverse fast fourier transform (IFFT), buffer the received data within a time slot, determine power of the received data within the time slot, and send power indication information and the received data respectively. The power indication information includes information of the power of the received data within the time slot. The device for power indication information receiving is configured to, receive power indication information to obtain information of power of data to be received within a time slot, generate a power control information according to the received power indication within a time interval, and receive the data and perform power control according to the power control information on the data. There is a time difference between receiving the power indication information and receiving the data.

In a six aspect, there is provided a device for power indication information sending. The device comprises a transmitting unit, a buffering unit, a determining unit. In accordance with some exemplary embodiments, the transmitting unit may be operable to carry out at least the transmitting step according to the first aspect of the present disclosure, the buffering unit may be operable to carry out at least the buffering step of the method according to the first aspect of the present disclosure, and the determining unit may be operable to carry out at least the determining step of the method according to the first aspect of the present disclosure.

In a seventh aspect, there is provided a device for power indication information receiving. The device for power indication information receiving comprises a transmitting unit and a generating unit. In accordance with some exemplary embodiments, the transmitting unit may be operable to carry out at least the transmitting step according to the second aspect of the present disclosure, the generating unit may be operable to carry out at least the generating step of the method according to the second aspect of the present disclosure.

In an eighth aspect, there is provided a computer-readable storage medium. The computer-readable storage medium storing instructions which when executed by at least one processor, cause the at least one processor to perform any of the method according to the first aspect of the present disclosure.

In a ninth aspect, there is provided a computer-readable storage medium. The computer-readable storage medium storing instructions which when executed by at least one processor, cause the at least one processor to perform any of the method according to the second aspect of the present disclosure.

In a tenth aspect, there is provided a computer program product. The computer program product includes instructions which, when executed on at least one processor, cause the at least one processor to perform any of the methods according to the first aspect of the disclosure.

In an eleventh aspect, there is provided a computer program product. The computer program product includes instructions which, when executed on at least one processor, cause the at least one processor to perform any of the methods according to the second aspect of the disclosure.

According to various embodiments of the present disclosure, data subjected to IFFT is received and the received data within a time slot is buffered, power of the received data within the time slot is determined, and power indication information that includes information of the power of the received data within the time slot and the received data are sent respectively. Therefore, energy efficiency is achieved in RAN or O-RAN.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
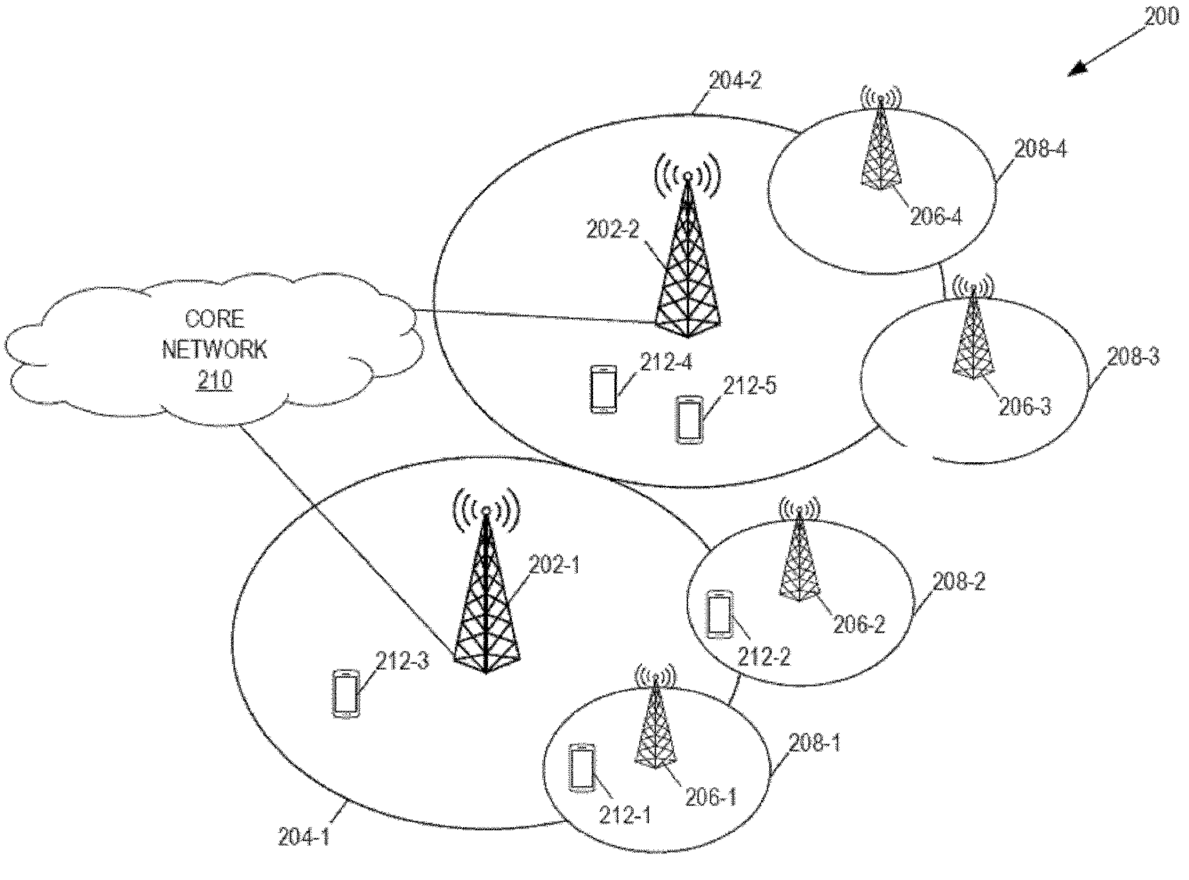
FIG. 1 schematically shows an example of a cellular communications system in which embodiments of the present disclosure may be implemented.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth.

Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Now some exemplary embodiments of the present disclosure will be described below with reference to the figures.

FIG. 1 schematically shows an example of a cellular communications system 200 in which embodiments of the present disclosure may be implemented. In the embodiments described herein, the cellular communications system 200 includes a RAN and a core network. In this example, the RAN includes base stations 202-1 and 202-2, which in the LTE include eNBs (i.e., LTE RAN nodes connected to EPC (Evolved Packet Core)) and in NR include gNB (i.e., NR RAN nodes connected to 5GC (5G core network)), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as 5GC and in LTE is referred to as EPC. The base stations 202 (and optionally the low power nodes 206) are connected to the core network 210.

Figure 2:
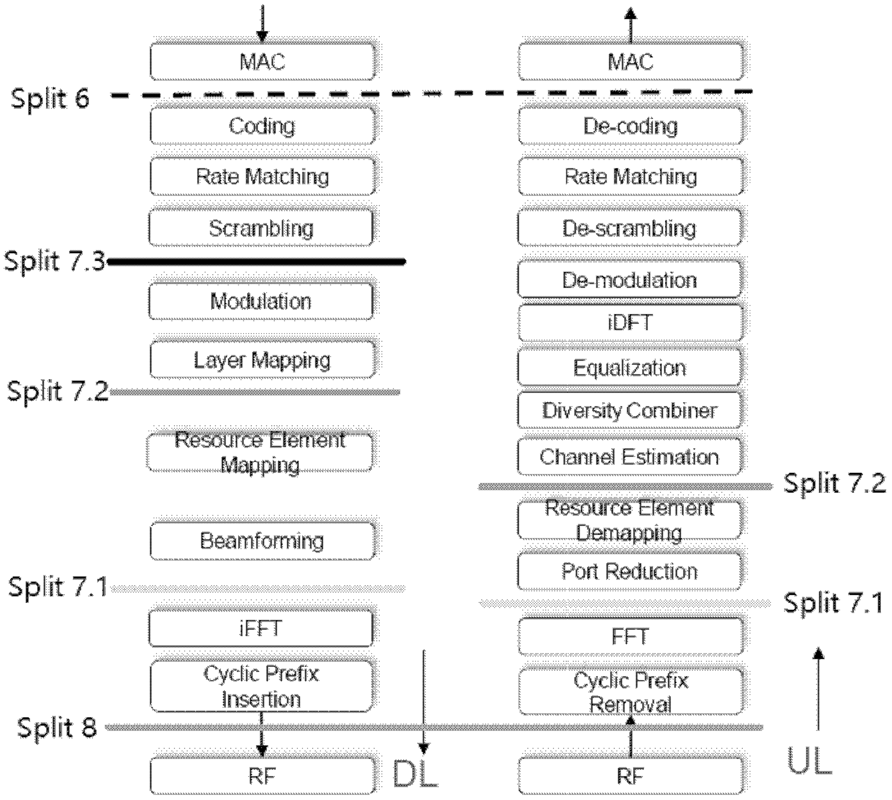
FIG. 2 schematically depicts 3GPP 5G NR functional splits.

FIG. 2 schematically depicts 3GPP 5G NR Functional Splits. In ORAN LLS structure, no matter option 7.1 or 7.2 (split 8 is out of the scope), IFFT function module is always deposited in Low PHY of RU (Down Link direction).

A method for power indication information transmission is provided in an embodiment.

Figure 3:
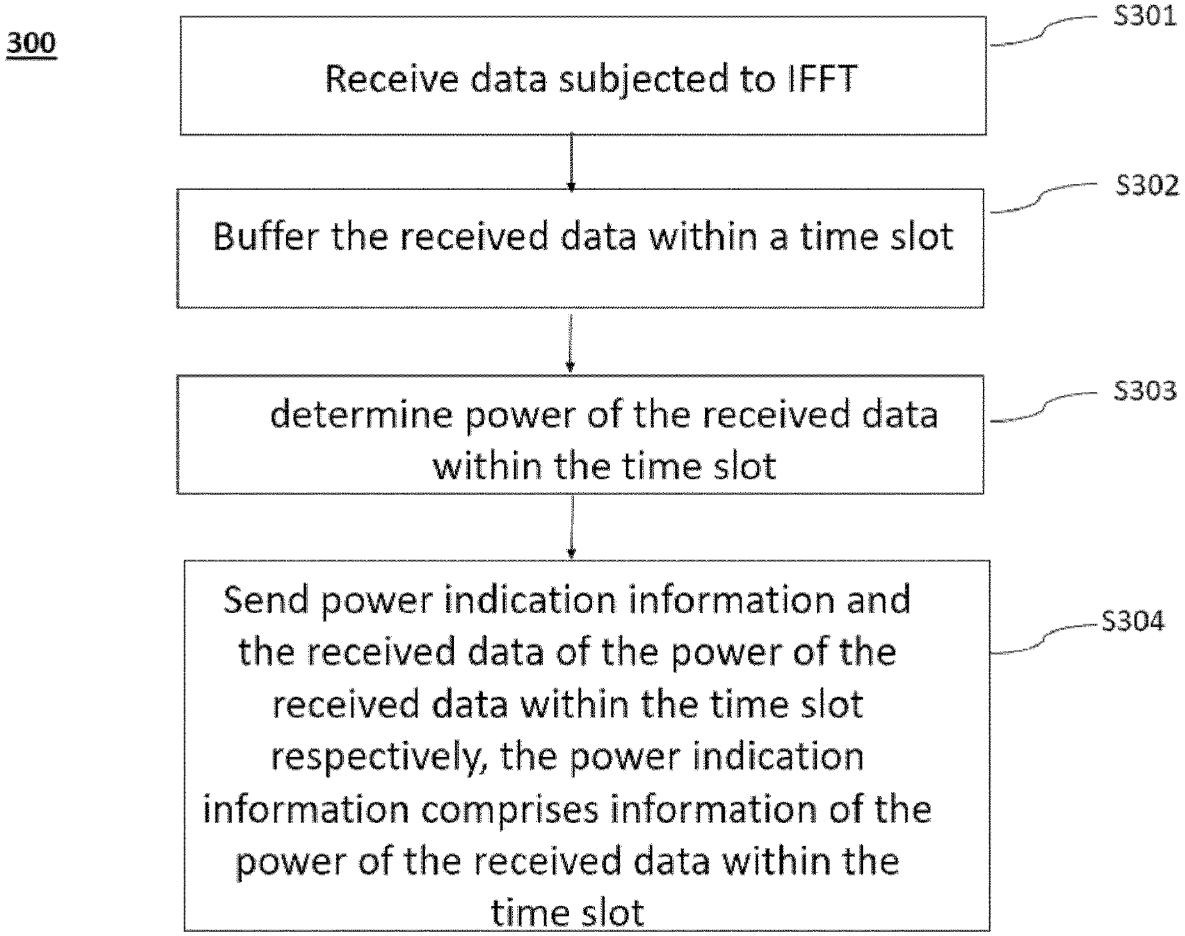
FIG. 3 is a diagram of a method for power indication information transmission according to an embodiment of the present disclosure.

FIG. 3 is a diagram which shows a method 300 for power indication information transmission in accordance with an embodiment of the present disclosure.

As shown in FIG. 3, the method 300 includes step 301-304.

In S301, data subjected to inverse fast fourier transform (IFFT) may be received.

In S302, the received data within a time slot may be buffered.

In S303, power of the received data within the time slot may be determined.

In S304, power indication information and the received data may be sent respectively. The power indication information comprises information of the power of the received data within the time slot.

In an exemplary embodiment, sending the power indication information and the received data respectively includes: sending the received data after a time interval from the transmission of the power indication information.

In an exemplary embodiment, the power indication information includes the power of the received data on each symbol within the time slot.

In an exemplary embodiment, the received data is inphase and quadrature (IQ) data, power of the received data on each OFDM symbol within the time slot is determined according to following formula: $10 \cdot \log 10(I[n]^2+Q[n]^2)-10 \cdot \log 10(FS)$, wherein I is I component of the IQ data, Q is Q component of the IQ data, FS is full-scale power level of the IQ data, n is an index of the OFDM symbol.

In an exemplary embodiment, a length of the time interval is greater than a first threshold and smaller than a second threshold.

Figure 4:
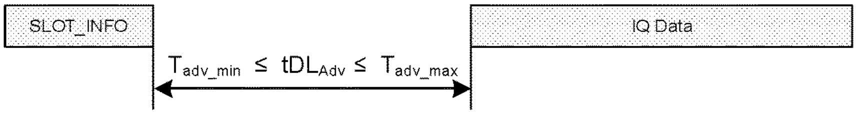
FIG. 4 schematically shows an example of time difference between sending slot information and IQ data.

In an exemplary embodiment, the power indication information is included in slot information. The slot information shall be sent in advance of the actual IQ data. This is done to ensure that power indication information is available in the DFE some time before the IQ data arrives, over a Common Public Radio Interface (CPRI) interface. The following requirements shall apply for the time window for slot information. The values may vary among products depending on hardware types and/or other parameters, e.g., subcarrier spacing. FIG. 4 schematically shows an example of time difference between sending slot information and IQ data. In FIG. 4, tDLAdv represents a time length of difference between sending slot information and IQ data. $T_{adv\_min}$ represents a minimum time length of the difference between sending slot information and IQ data. $T_{adv\_max}$ represents a maximum time length of the difference between sending slot information and IQ data.

Figure 5:
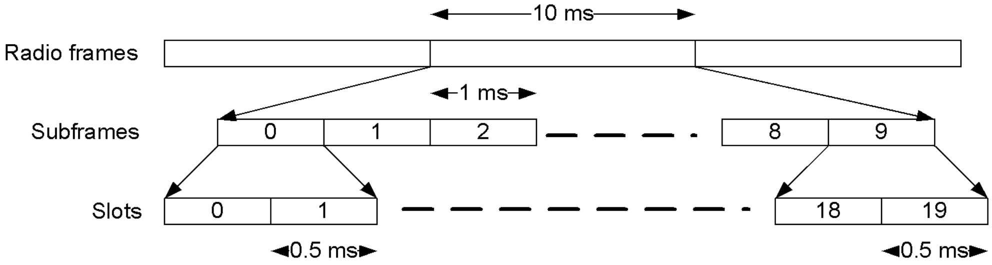
FIG. 5 is a diagram of Type 1 frame structure.
Figure 6:
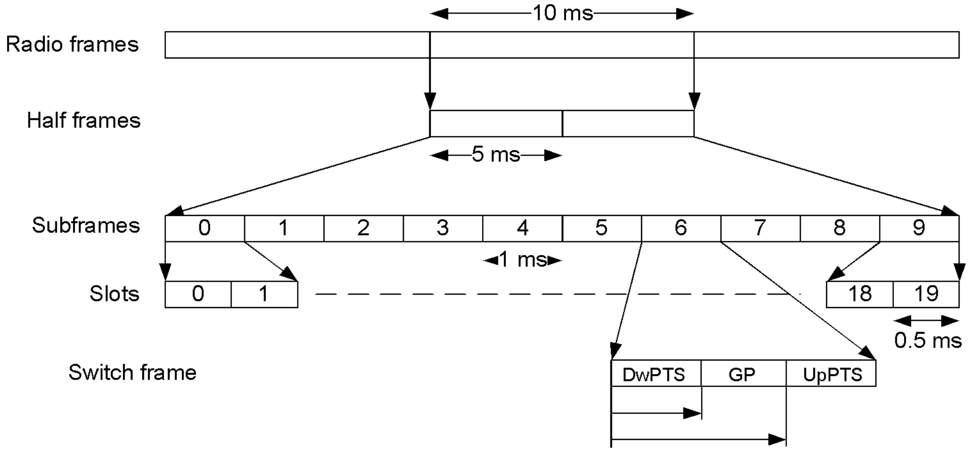
FIG. 6 is a diagram of Type 2 frame structure.

In LTE two different frame structures are defined; Type 1 and Type 2 frame structure. FIG. 5 shows the Type 1 version and FIG. 6 shows the Type 2 frame structure. The Type 1 frame structure is applicable for both full duplex and half duplex FDD, and the Type 2 frame structure is only applicable for TDD.

A Type 2 radio frame consists of 2 half frames of length 5 ms which consists of 5 subframes of length 1 ms. One or more of subframes within one radio frame are "switch frames", in FIG. 8 subframe 6 is a switch frame (as an example). The switch subframes consists of the three special fields DwPTS, GP and UpPTS. The lengths of these fields are configurable depending on switch-point periodicity etc. but the sum of all three fields shall be 1 ms.

The slot information is sent in advance of the actual IQ data so that the information is available in the resource element (RE) some time before the IQ data arrives over the CPRI interface. In an example, the slot information should be delivered to the RE at least 1 OFDM symbol before the actual samples. Depending on the cyclic prefix for a specific OFDM symbol the length of a symbol is in the range 71.35 μs to 83.33 μs (for Δf=15 kHz). The information should not be delivered to the RE earlier than 7 OFDM symbols (500 μs) before the IQ data.

The number of OFDM symbols within one subframe will also differ depending on whether the antenna carrier is configured to use the "normal cyclic prefix" or the "extended cyclic prefix", this is applicable both for the Type 1 and the Type 2 frame structure. The number of OFDM symbols in a slot is according to Table 2: Number of OFDM symbols in a slot.

TABLE 2

Number of OFDM symbols in a slot

| Cyclic prefix configuration | Number of symbols in a 0.5 ms slot |
|---|---|
| Normal Δf = 15 kHz | 7 |
| Extended Δf = 15 kHz | 6 |
| Extended Δf = 7.5 kHz | 3 |

In an example, tDLAdv may greater than or equal to $T_{adv\_min}$ and less than or equal to $T_{adv\_max}$. For example, $T_{adv\_min}$=30 μs by default, different values can be used for specific HW types; $T_{adv\_max}$=Tslot−30 μs, valid for subcarrier spacing, 15, 30 and 60 kHz; $T_{adv\_max}$=Tslot, valid for subcarrier spacing, 120 and 240 kHz, where Tslot represent a time length of a time slot. The following table 1 shows relationships between subcarrier spacing, slot length, $T_{adv\_min}$ and $T_{adv\_max}$

TABLE 1

Relationships between subcarrier spacing, slot length, $T_{adv\_min}$ and $T_{adv\_max}$.

| $n_{sc}$ | Sub-carrier spacing $\Delta f = 2^{nsc} \cdot 15$ [kHz] | Slot per subframe | Slot length, µs | $T_{adv\_min}$ µs | $T_{adv\_max}$, µs |
|---|---|---|---|---|---|
| 0 | 15 | 1 | 1000 | 30 | 970 |
| 1 | 30 | 2 | 500 | 30 | 470 |
| 2 | 60 | 4 | 250 | 30 | 220 |
| 3 | 120 | 8 | 125 | 30 | 125 |
| 4 | 240 | 16 | 62.5 | 30 | 62.5 |

The following table 2 shows an example of power indication field of symbols in slot information.

TABLE 2

Power indication field of symbols in slot information

| OFDM sample index | Symbol power indication: |
|---|---|
| 0 | 000000 |
| 1 | 000001 |
| 2 | 000010 |
| . . . | . . . . . . |
| n | 111111 |

In above example, the dynamic power range is from 2 dB (Full power) to −16 dB. 000000 means no power, that is a certain OFDM symbol does not contain any data at all, it is allowed for the radio unit to turn off specific parts of the hardware in the tx chain in order to save power, any other values mean full power or other power. This is applicable for both FDD and TDD configurations.

In the above example, IQ sample may be buffered for generating slot information as part of IQ control message, the above requirement also shall be followed. Moreover, the new added processing time, including exacting, buffering and final generating, should be considered as well. That means IQ data shall be remained in cache longer.

Figure 7:
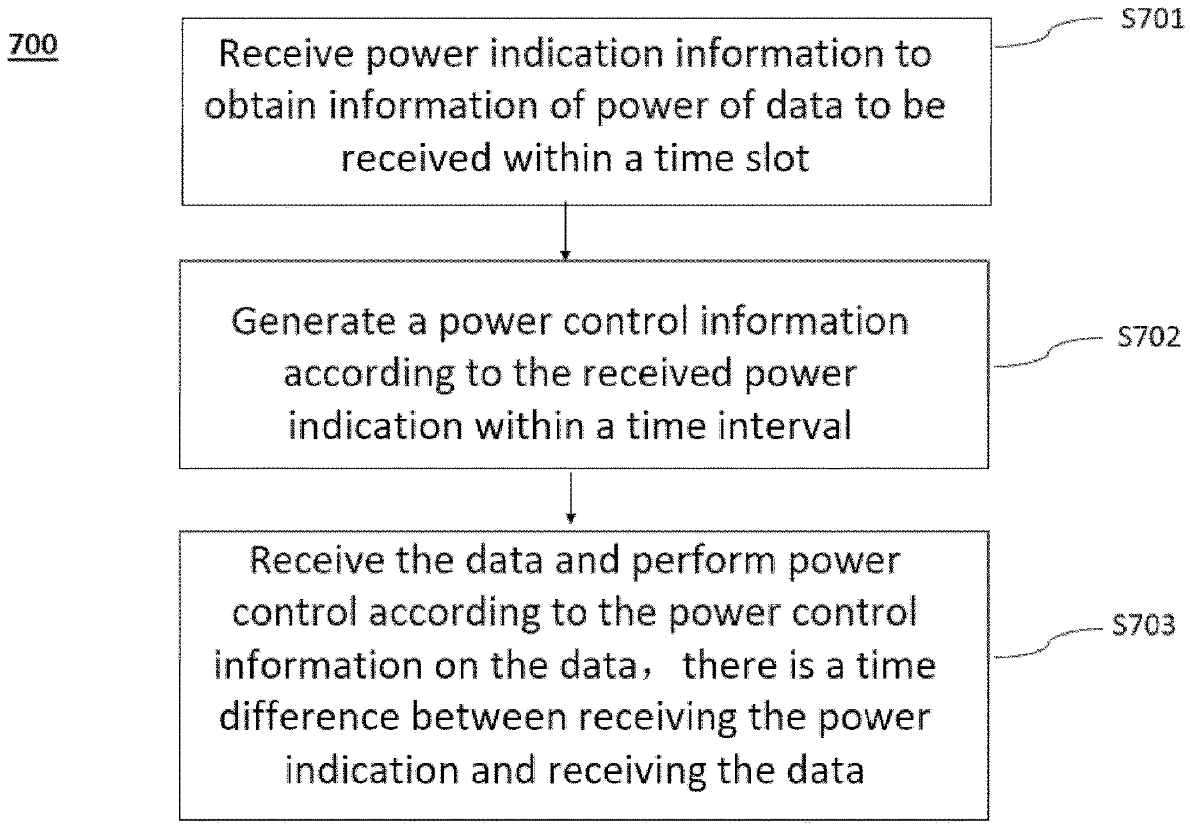
FIG. 7 is a diagram of a method for power indication information transmission according to an embodiment of the present disclosure.

FIG. 7 is a diagram of a method for power indication information transmission according to an embodiment of the present disclosure.

In S701, power indication information is received to obtain information of power of data to be received within a time slot.

In S702, power control information is generated according to the received power indication information within the time interval.

In S703, the data is received and power control is performed according to the power control information on the data. There is a time difference between receiving the power indication information and receiving the data.

In an exemplary embodiment, the time difference between receiving the power indication information and receiving the data is the time interval, the data may be received after the time interval from receiving the power indication information.

In an exemplary embodiment, the information of power of the data within a time slot may comprise power of the data on each OFDM symbol within the time slot.

In an exemplary embodiment, a power control sequence corresponding to the power of the data on each OFDM symbol within the time slot may be generated.

In an exemplary embodiment, the power control sequence may comprise indication whether to allocate power to a corresponding OFDM symbol.

In an exemplary embodiment, the power control sequence may further comprise power of the corresponding OFDM symbol.

In an exemplary embodiment, power may be allocated to each OFDM symbol according to the power control sequence.

In an exemplary embodiment, the received data is inphase and quadrature (IQ) data, power of the received data on each OFDM symbol within the time slot is determined according to following formula: $10 \cdot \log 10(I[n]^2+Q[n]^2)-10 \cdot \log 10(FS)$, wherein I is I component of the IQ data, Q is Q component of the IQ data, FS is full-scale power level of the IQ data, n is an index of the OFDM symbol.

In an exemplary embodiment, a length of the time interval may be greater than a first threshold and smaller than a second threshold.

The various blocks shown in FIGS. 3 and 7 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 8:
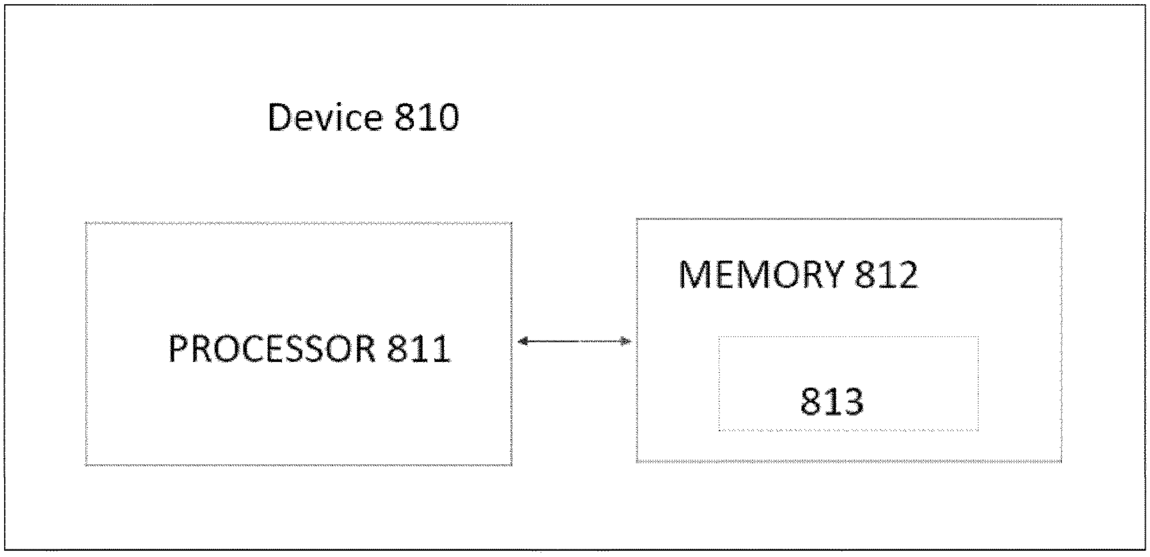
FIG. 8 is a block diagram illustrating a device for power indication information sending or receiving according to an embodiment of the present disclosure.

FIG. 8 is a block diagram illustrating a device for power indication information sending/receiving according to an embodiment of the present disclosure.

As shown in FIG. 8, the device 810 may comprise one or more processors such as processor 811 and one or more memories such as memory 812 storing computer program codes 813. The memory 812 may be non-transitory machine/processor/computer readable storage medium.

In some implementations, the one or more memories 812 and the computer program codes 813 may be configured to, with the one or more processors 811, cause the network node 810 at least to perform any operation of the method as described in connection with FIG. 3. In other implementations, the one or more memories 812 and the computer program codes 813 may be configured to, with the one or more processors 811, cause the device 810 at least to perform any operation of the method as described in connection with FIG. 3 or to perform any operation of the method as described in connection with FIG. 7. Alternatively or additionally, the one or more memories 812 and the computer program codes 813 may be configured to, with the one or more processors 811, cause the device 810 at least to perform more or less operations to implement the proposed methods according to the exemplary embodiments of the present disclosure.

Figure 9:
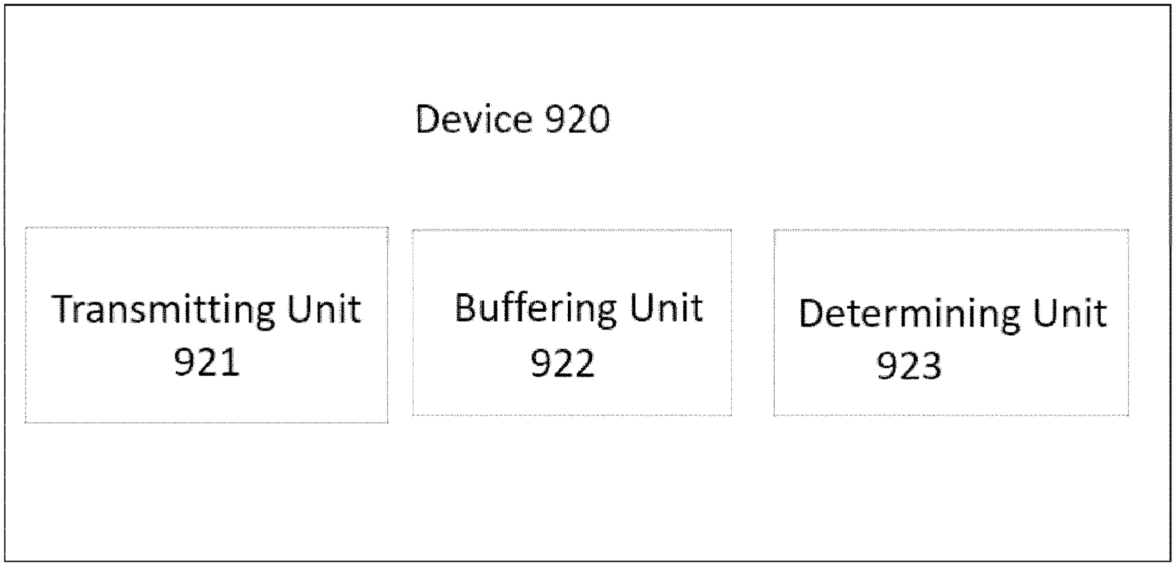
FIG. 9 is a block diagram illustrating a device for power indication information sending according to an embodiment of the present disclosure.

FIG. 9 is a block diagram illustrating a device for power indication information sending according to an embodiment of the present disclosure. As shown in FIG. 9, the device 910 may comprise a transmitting unit 921, a buffering unit 922 and a determining unit 923. The transmitting unit 921 may be operable to carry out the operation in S301 and S304. The buffering unit 922 may be operable to carry out the operation in S302, and the determining unit 923 may be operable to carry out the operation in S303. Optionally, the transmitting unit 921, the buffering unit 922 and/or the determining unit 923 may be operable to carry out more or less operations to implement the proposed methods according to the exemplary embodiments of the present disclosure.

It should be appreciated that the components included in the device 910 may be implemented in various manners, including software, hardware, firmware, or any combination thereof. In an embodiment, one or more units may be implemented using software and/or firmware, for example, machine-executable instructions stored on the storage medium. In addition to or instead of machine-executable instructions, parts or all of the components included in the apparatus 1500 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 10:
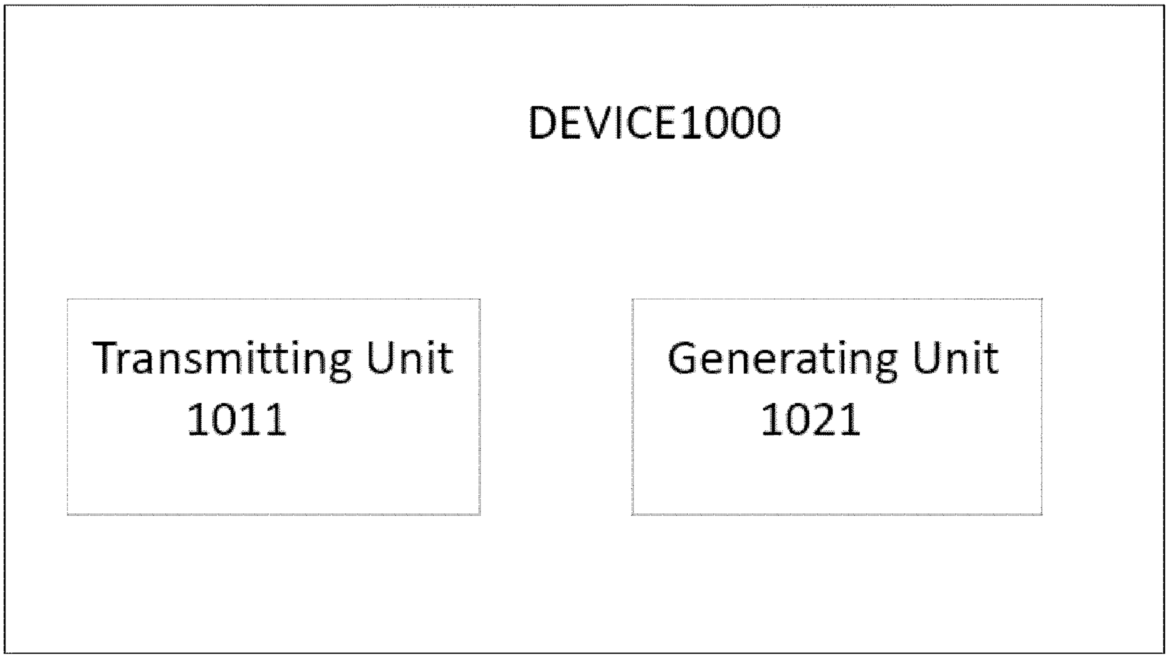
FIG. 10 is a block diagram illustrating a device for power indication information receiving according to an embodiment of the present disclosure.

FIG. 10 is a block diagram illustrating a device for power indication information receiving according to an embodiment of the present disclosure. As shown in FIG. 10, the device 1000 may comprise a transmitting unit 1011, a generating unit 1021. The transmitting unit 1011 may be operable to carry out the operation in S701 and S703. The generating unit 1021 may be operable to carry out the operation in S702. Optionally, the transmitting unit 1011 and/or the generating unit 1021 may be operable to carry out more or less operations to implement the proposed methods according to the exemplary embodiments of the present disclosure.

It should be appreciated that the components included in the device 9 1000 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 1400 may be implemented, at least in part, by one or more hardware logic components.

For example, and without limitation, illustrative types of hardware logic components that can be used include Field-programmable Gate Arrays (FPGAs), Application-specific Integrated Circuits (ASIC s), Application-specific Standard Products (ASSPs), System-on-a-chip systems (SOCs), Complex Programmable Logic Devices (CPLDs), and the like.

Figure 11:
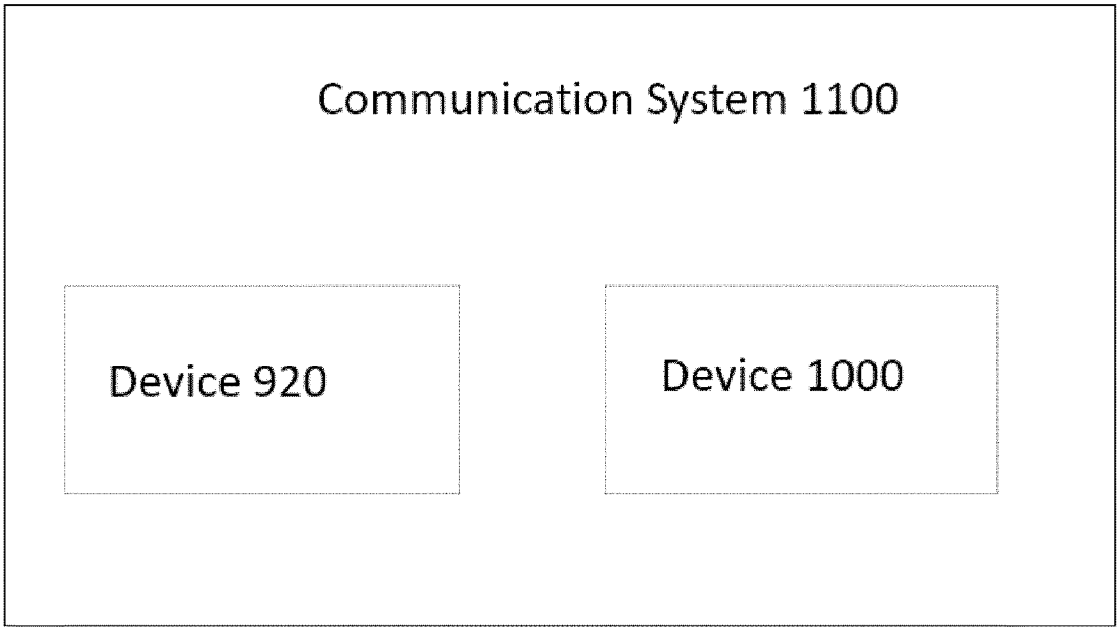
FIG. 11 is a block diagram illustrating a communication system according to an embodiment of the present disclosure.

A communications system is provided, as shown in FIG. 11. the communication system 1100 includes a device for power indication information sending 910 in FIG. 9 and a device for power indication information receiving 1000 in FIG. 10. The device 910 is configured to carry out the operations in FIG. 3 and the device 1000 is configured to carry out the operations in FIG. 7. Optionally, the device 910 and/or the device 1000 may be operable to carry out more or less operations to implement the proposed methods according to the exemplary embodiments of the present disclosure.

Figure 12:
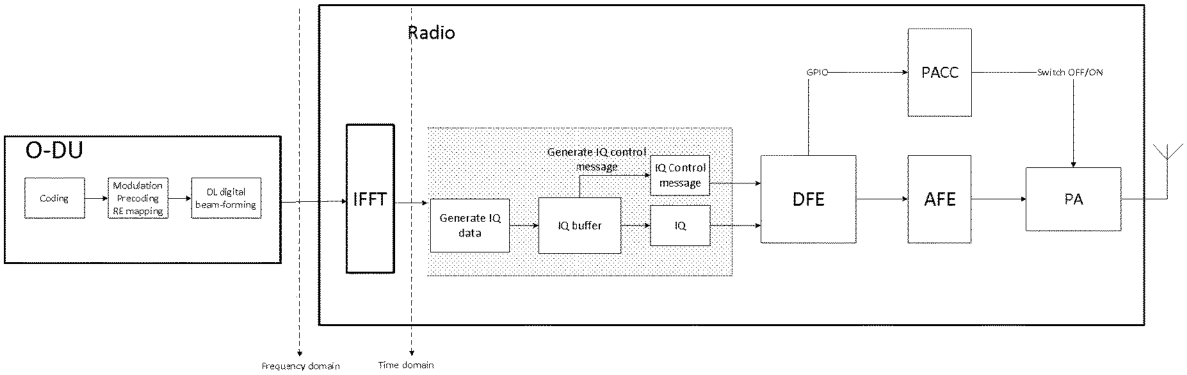
FIG. 12 is a block diagram of hardware structure that is suitable for implementing embodiments of the present disclosure.

FIG. 12 is a block diagram of hardware structure that is suitable for implementing embodiments of the present disclosure. The hardware structure comprises a DU part (e.g., ORAN-DU), and a RU. FIG. 11 depicts the general framework of Low layer of DU and RU, the gray shade is the new added functionality and slot information may be generated by this module, that means the entire process is finished in time domain. The solution will introduce a buffer to storage IQ data in a slot each time and generate corresponding IQ control message (power indication information) with power information of each symbol. Then IQ control message may be sent a little earlier (~30 us) than the IQ data to DFE. DFE may use the control message to get power of IQ data on each symbol and perform power saving then.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing.

More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for power indication information transmission, comprising:

receiving data subjected to inverse fast fourier transform (IFFT);

buffering the received data within a time slot;

determining a power level of the received data for each orthogonal frequency division multiplexing (OFDM) symbol within the time slot;

sending separately, power indication information and the received data, wherein the power indication information comprises a respective power indication field for each OFDM symbol within the time slot, wherein each respective power indication field indicates the determined power level of the received data for the corresponding OFDM symbol.

2. The method of claim 1, wherein sending the power indication information and the received data respectively comprises: sending the received data after a time interval from the transmission of the power indication information.

3. The method of claim 1, wherein determining the power of the received data within the time slot comprises: determining power of the received data on each OFDM symbol within the time slot.

4. The method of claim 3, wherein the power indication information comprises the power of the received data on each symbol within the time slot.

5. The method of claim 1, wherein the received data is inphase and quadrature (IQ), data, power of the received data on each OFDM symbol within the time slot is determined according to following formula: $10\cdot\log 10(I[n]^2+Q[n]^2)-10\cdot\log 10(FS)$, wherein I is I component of the IQ data, Q is Q component of the IQ data, FS is full-scale power level of the IQ data, n is an index of the OFDM symbol.

6. The method of claim 2, wherein a length of the time interval is greater than a first threshold and smaller than a second threshold.

7. A device for power indication information sending, comprising a processor and a memory wherein the memory containing instructions executable by the processor whereby the device is operative to:

receive data subjected inverse fast fourier transform (IFFT);

buffer the received data within a time slot;

determine a power level of the received data for each orthogonal frequency division multiplexing (OFDM) symbol within the time slot;

send separately, power indication information and the received data, wherein the power indication information comprises a respective power indication field for each OFDM symbol within the time slot, wherein each respective power indication field indicates the determined power level of the received data for the corresponding OFDM symbol.

8. The device of claim 7, wherein sending the power indication information and the received data respectively comprises: sending the received data after a time interval from the transmission of the power indication information.

* * * * *